(12) United States Patent
Gendler

(10) Patent No.: US 11,360,540 B2
(45) Date of Patent: Jun. 14, 2022

(54) PROCESSOR CORE ENERGY MANAGEMENT

(71) Applicant: Intel Corporation, Santa Clara, CA (US)

(72) Inventor: Alexander Gendler, Kiriat Motzkin (IL)

(73) Assignee: Intel Corporation, Santa Clara, CA (US)

( * ) Notice: Subject to any disclaimer, the term of this patent is extended or adjusted under 35 U.S.C. 154(b) by 178 days.

(21) Appl. No.: 16/261,370

(22) Filed: Jan. 29, 2019

(65) Prior Publication Data

US 2019/0171273 A1    Jun. 6, 2019

Related U.S. Application Data

(63) Continuation of application No. 14/969,561, filed on Dec. 15, 2015, now abandoned.

(51) Int. Cl.
| | | |
|---|---|---|
| *G06F 1/00* | (2006.01) | |
| *G06F 1/324* | (2019.01) | |
| *G06F 1/3206* | (2019.01) | |
| *G06F 1/3296* | (2019.01) | |

(52) U.S. Cl.
CPC ............ *G06F 1/324* (2013.01); *G06F 1/3206* (2013.01); *G06F 1/3296* (2013.01); *Y02D 10/00* (2018.01)

(58) Field of Classification Search
CPC ...... G06F 1/324; G06F 1/3206; G06F 1/3296; Y02D 10/00
See application file for complete search history.

(56) References Cited

U.S. PATENT DOCUMENTS

| | | | |
|---|---|---|---|
| 4,147,993 A | 4/1979 | Sizmur et al. |
| 5,574,849 A | 11/1996 | Sonnier et al. |
| 5,736,956 A | 4/1998 | Kennedy et al. |
| 5,751,955 A | 5/1998 | Sonnier et al. |
| 6,009,488 A | 12/1999 | Kavipurapu |
| 6,678,756 B1 | 1/2004 | Tseng et al. |
| 6,687,255 B1 | 2/2004 | Holm et al. |
| 6,711,227 B1 | 3/2004 | Kaylani et al. |
| 6,711,696 B1 | 3/2004 | Bates et al. |

(Continued)

FOREIGN PATENT DOCUMENTS

| | | |
|---|---|---|
| CN | 104520823 | 6/2013 |
| CN | 104737093 | 6/2015 |

(Continued)

OTHER PUBLICATIONS

Phase Locked Loop, ScienceDirect, 2002 (Year: 2002).*

(Continued)

*Primary Examiner* — Xuxing Chen
(74) *Attorney, Agent, or Firm* — Schwabe, Williamson & Wyatt, P.C.

(57) ABSTRACT

Methods and apparatus relating to techniques for processor core energy management are described. In an embodiment, energy management logic causes a modification to energy consumption by an electrical load (such as a processor core) based at least in part on comparison of an electrical current value and an operating current threshold value. The electrical current value is detected at an electrical current sensor coupled to the electrical load. Other embodiments are also disclosed and claimed.

18 Claims, 8 Drawing Sheets

(56) References Cited

U.S. PATENT DOCUMENTS

| | | | |
|---|---|---|---|
| 7,089,443 | B2 | 8/2006 | Albonesi et al. |
| 7,107,393 | B1 | 9/2006 | Sabih |
| 7,296,174 | B2 | 11/2007 | Kelly |
| 7,310,396 | B1 | 12/2007 | Sabih |
| 7,428,652 | B2 | 9/2008 | Rodriguez et al. |
| 7,954,000 | B2 | 5/2011 | Allen et al. |
| 8,205,111 | B2 | 6/2012 | Hill et al. |
| 2003/0188213 | A1 | 10/2003 | Kark et al. |
| 2007/0073977 | A1 | 3/2007 | Safranek et al. |
| 2009/0089543 | A1 | 4/2009 | Gunther et al. |
| 2010/0174936 | A1 | 7/2010 | Hill et al. |
| 2011/0316593 | A1 | 12/2011 | Muench et al. |
| 2012/0179416 | A1 | 7/2012 | Anderson et al. |
| 2012/0216058 | A1 | 8/2012 | Wells et al. |
| 2013/0173082 | A1 | 7/2013 | Pippin |
| 2013/0346774 | A1* | 12/2013 | Bhandaru ............ G06F 1/3234 713/320 |
| 2014/0019780 | A1 | 1/2014 | Abernathy et al. |
| 2014/0089698 | A1 | 3/2014 | Ng et al. |
| 2014/0095912 | A1 | 4/2014 | Hurd |
| 2014/0122916 | A1 | 5/2014 | Garcia et al. |
| 2015/0006925 | A1 | 1/2015 | Branover et al. |

FOREIGN PATENT DOCUMENTS

| | | |
|---|---|---|
| EP | 2703944 | 3/2014 |
| TW | 201725477 | 7/2017 |
| WO | 2017105585 | 6/2014 |

OTHER PUBLICATIONS

Partial Supplementary Search Report dated Jul. 17, 2019 for EP Patent Application No. 16876206.0.
International Search Report & Written Opinion dated Jan. 11, 2017 for PCT Patent Application No. PCT/US2016/055222.
Advisory Action dated Oct. 26, 2018 for U.S. Appl. No. 14/969,561.
Final Office Action dated Aug. 7, 2018 for U.S. Appl. No. 14/969,561.
Non-Final Office Action dated Feb. 9, 2017 for U.S. Appl. No. 14/969,561.
Notice of Allowance dated Feb. 23, 2012 for U.S. Appl. No. 12/348,054.
Office Action dated Oct. 25, 2011 for U.S. Appl. No. 12/348,054.
Extended Search Report dated Oct. 23, 2019 for EP Patent Application No. 16876206.0.
Non-Final Office Action dated Dec. 7, 2020 for Chinese Patent Application No. 201680066673.4.
Extended European Search Report dated Nov. 4, 2020 for EP Patent Application No. 20181251.8.
Search Report dated Sep. 15, 2020 for Taiwan Patent Application No. 105134587.
Office Action dated May 14, 2021 for Chinese Patent Application No. 201680066673.4. No translation.
Taiwan Search Report & Action dated May 3, 2021 for Taiwan Patent Application No. 105134587.
Anderson, J., "Digital Transmission Engineering", First published: Aug. 7, 2005. Print ISBN:9780471694649 |Online ISBN:9780471733669 |DOI:10.1002/0471733660 Copyright © 2005 Institute of Electrical and Electronics Engineers, Inc. pp. 150-153 (6 pages).
Frenzel, Jr., "Electronics Explained the New Systems Approach to Learning Electronics", copyright 2010 Elsevier Inc. ISBN 978-1-85671-700-9. pp. 79-81.

* cited by examiner

PROCESSOR CORE ENERGY MANAGEMENT

RELATED APPLICATIONS

This application is a continuation of and claims priority under 35 U.S.C. § 120 of U.S. patent application Ser. No. 14/969,561, filed Dec. 15, 2015, entitled "PROCESSOR CORE ENERGY MANAGEMENT," the entire disclosure of which is incorporated herein by reference for all purposes.

FIELD

The present disclosure generally relates to the field of electronics. More particularly, some embodiments relate to techniques for processor core energy management.

BACKGROUND

As integrated circuit (IC) fabrication technology improves, manufacturers are able to integrate additional functionality onto a single silicon substrate. As the number of these functionalities increases, however, so does the number of components on a single IC chip. Additional components add additional signal switching, in turn, generating more heat. The additional heat may damage an IC chip by, for example, thermal expansion.

Also, the additional heat may limit usage locations and/or applications of a computing device that includes such chips. For example, a portable computing device may solely rely on battery power for its operations. Hence, as additional functionality is integrated into portable computing devices, the need to reduce power consumption becomes increasingly important, for instance, to maintain battery power for an extended period of time. Non-portable computing systems also face cooling and power generation issues as their IC components use more power and generate more heat.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

To improve power consumption efficiency, some Central Processing Units (CPUs) (also referred to herein interchangeably as "processors" or processor "cores") may allow for adjustments to their operating characteristics such as their operating frequency. However, these adjustments may only be applicable for relatively longer durations, e.g., above 10 usec (or micro seconds).

To this end, some embodiments provide techniques for processor core energy management. At least one embodiment works at logic block (or IP (Intellectual Property) block) level and has no requirement for an SOC (System On Chip) interface. By contrast some solutions (such as RAPL) may work at an SOC level (which may provide a global view). More particularly, RAPL (or Running Average Power Limit) provides power consumption measurements in some CPUs. However, such solutions generally lack the ability to provide optimized/improved energy management for short periods of time, e.g., at or below 100 usec. Moreover, communication latency is only about 10 usec in some embodiments. With the immediate frequency change infrastructure, some embodiments allow for changing of the operating frequency without draining additional power. In one embodiment, the processor core energy management technique may be applied for periods of less than 1 usec, and potentially improve energy efficiency of logic/IP block(s) by gaining about one bin on an existing load line (such as a processor core). As discussed herein, a product "bin" generally refers to the categorizing of a finished product (such as a processor core) based on its thermal and/or frequency characteristics/performance.

Figure 1:
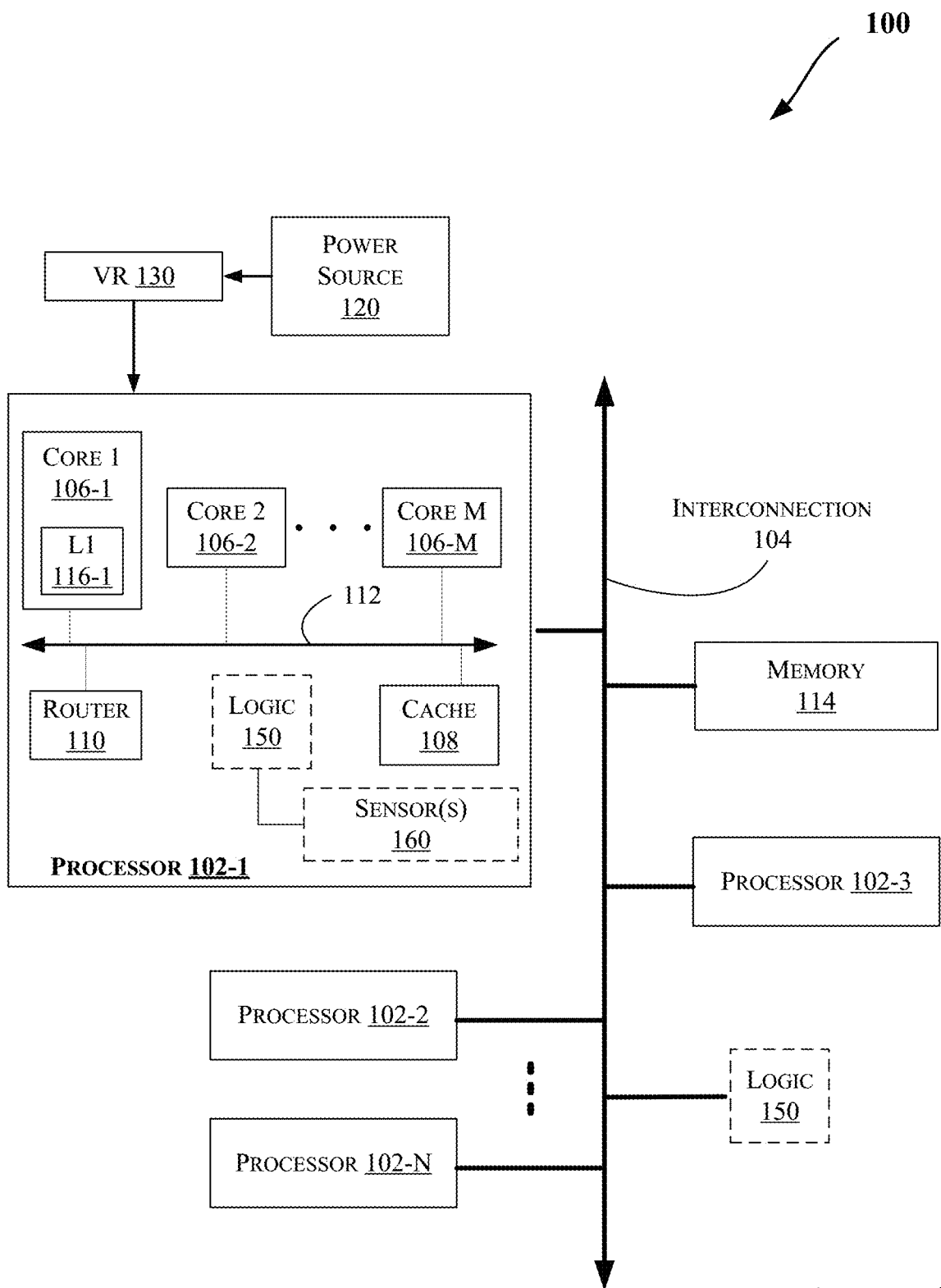
FIGS. 1, 4, 5, and 6 illustrate block diagrams of embodiments of computing systems, which may be utilized to implement various embodiments discussed herein.

Furthermore, some embodiments may be applied in computing systems that include one or more processors (e.g., with one or more processor cores), such as those discussed with reference to FIGS. 1-6, including for example mobile computing devices (and/or platforms) such as a smartphone, tablet, UMPC (Ultra-Mobile Personal Computer), laptop computer, Ultrabook™ computing device, smart watch, smart glasses, wearable devices, etc., and/or larger systems such as computer servers with many cores, etc. More particularly, FIG. 1 illustrates a block diagram of a computing system 100, according to an embodiment. The system 100 may include one or more processors 102-1 through 102-N (generally referred to herein as "processors 102" or "processor 102"). The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or "core 106"), a cache 108, and/or a router 110. The processor cores 106 may be implemented on a single integrated circuit (IC) chip. Moreover, the chip may include one or more shared and/or private caches (such as cache 108), buses or interconnections (such as a bus or interconnection 112), graphics and/or memory controllers (such as those discussed with reference to FIGS. 4-6), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102 (e.g., faster access by cores 106). As shown in FIG. 1, the memory 114 may communicate with the processors 102 via the interconnection 104. In an embodiment, the cache 108 (that may be shared) may be a mid-level cache (MLC), a last level cache (LLC), etc. Also, each of the cores 106 may include a level 1 (L1) cache (116-1) (generally referred to herein as "L1 cache 116") or other levels of cache such as a level 2 (L2) cache. Moreover, various components of the processor 102-1 may communicate with the cache 108 directly, through a bus (e.g., the bus 112), and/or a memory controller or hub.

The system 100 may also include a platform power source 120 (e.g., a Direct Current (DC) power source or an Alternating Current (AC) power source) to provide power to one or more components of the system 100. The power source 120 could include a PV (Photo Voltaic) panel, wind generator, thermal generator water/hydro turbine, etc. In some embodiments, the power source 120 may include one or more battery packs (e.g., charged by one or more of a PV panel, wind generator, thermal generator water/hydro turbine, plug-in power supply (for example, coupled to an AC power grid), etc.) and/or plug-in power supplies. The power source 120 may be coupled to components of system 100 through a Voltage Regulator (VR) 130. Moreover, even though FIG. 1 illustrates one power source 120 and a single voltage regulator 130, additional power sources and/or voltage regulators may be utilized. For example, one or more of the processors 102 may have corresponding voltage regulator(s) and/or power source(s). Also, the voltage regulator(s) 130 may be coupled to the processor 102 (and/or cores 106) via a single power plane (e.g., supplying power to all the cores 106) or multiple power planes (e.g., where each power plane may supply power to a different core or group of cores).

As discussed herein, various type of voltage regulators may be utilized for the VR 130. For example, VR 130 may include a "buck" VR (which is generally used in power delivery applications in which an input voltage needs to be transformed to an output voltage in a ratio that is smaller than unity) or a "boost" VR (which is generally used in power delivery applications in which an input voltage needs to be transformed to an output voltage in a ratio that is larger than unity), combinations thereof such as a buck-boost VR, etc.

Additionally, while FIG. 1 illustrates the power source 120 and the voltage regulator 130 as separate components, the power source 120 and the voltage regulator 130 may be incorporated into other components of system 100. For example, all or portions of the VR 130 may be incorporated into the power source 120 and/or processor 102.

As shown in FIG. 1, system 100 may further include logic 150 to manage processor core energy, e.g., as discussed herein with reference to some embodiments. In an embodiment, logic 150 is provided on a Reconfigurable Power Management ICs (RPMICs), such as a PMIC (Power Management IC) and/or an IMVP (Intel® Mobile Voltage Positioning). Further, such RPMIC implementation(s) may be used in low power devices (such as portable devices discussed herein) through large computer servers such as discussed herein with reference to FIG. 1 or 4-6.

As shown, the logic 150 may be provided in the processor 102. However, embodiments are not limited to this configuration and logic 150 may be alternatively coupled to (or incorporated) in the VR 130 and/or other components of system 100 such as one or more of the cores 106, the power source 120, and/or any other logic/IP block.

System 100 may also include one or more sensors 160 to sense/detect various values/variations in one or more factors having an effect on power/thermal behavior of the system/platform, such as electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system (such as the computing systems discussed herein with reference to FIGS. 1-6). Additionally, sensor(s) 160 may be coupled to logic 150 in at least one embodiment to allow logic 150 to manage processor core energy at least in part based on value(s) detected by one or more of the sensors 160, as will be further discussed herein.

Figure 2:
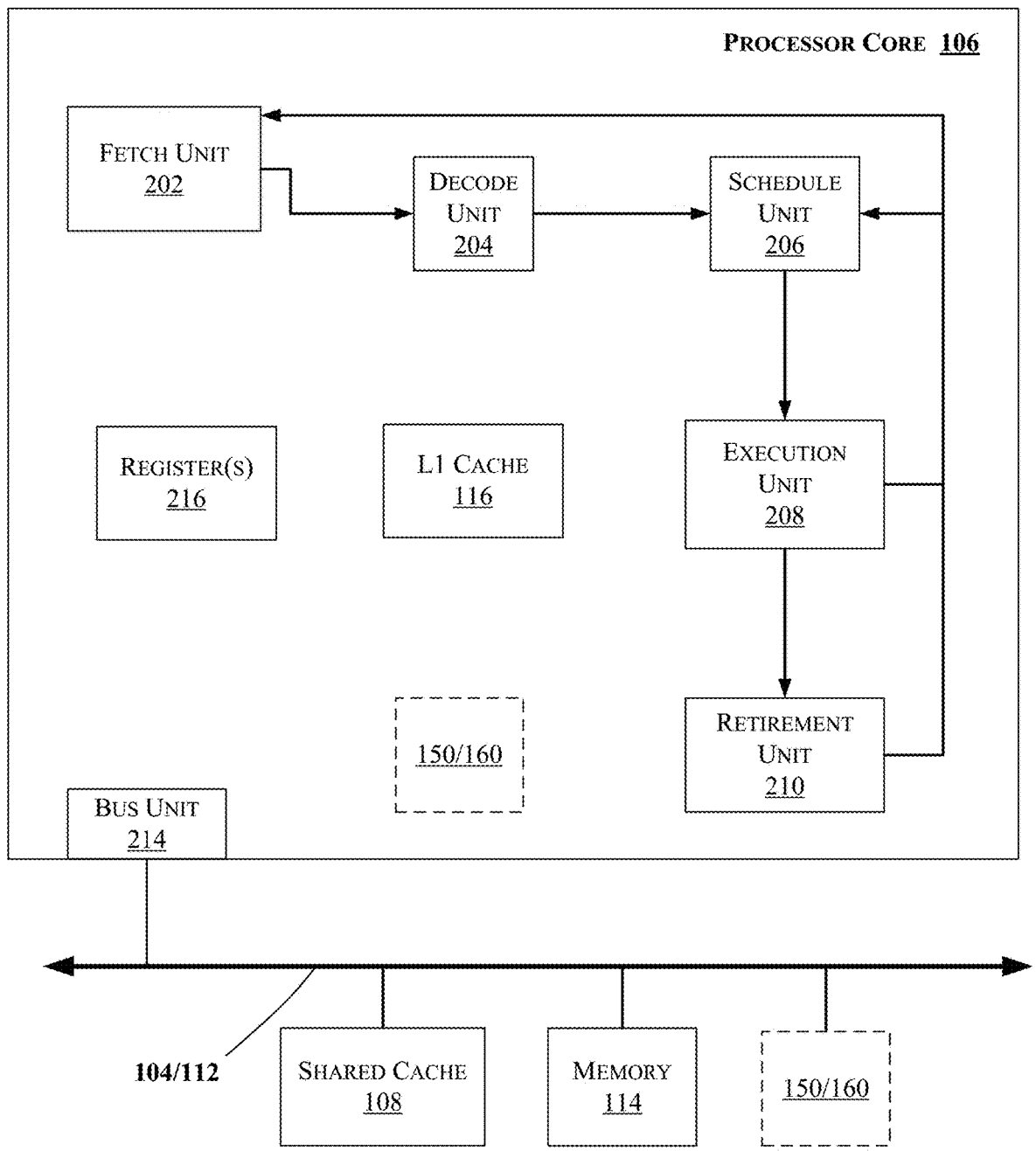
FIG. 2 illustrates a block diagram of portions of a processor core and other components of a computing system, according to an embodiment.

FIG. 2 illustrates a block diagram of portions of a processor core 106 and other components of a computing system, according to an embodiment. In one embodiment, the arrows shown in FIG. 2 illustrate the flow direction of instructions through the core 106. One or more processor cores (such as the processor core 106) may be implemented on a single integrated circuit chip (or die) such as discussed with reference to FIG. 1. Moreover, the chip may include one or more shared and/or private caches (e.g., cache 108 of FIG. 1), interconnections (e.g., interconnections 104 and/or 112 of FIG. 1), control units, memory controllers, or other components.

As illustrated in FIG. 2, the processor core 106 may include a fetch unit 202 to fetch instructions (including instructions with conditional branches) for execution by the core 106. The instructions may be fetched from any storage devices such as the memory 114 and/or the memory devices discussed with reference to FIGS. 4-6. The core 106 may also include a decode unit 204 to decode the fetched instruction. For instance, the decode unit 204 may decode the fetched instruction into a plurality of uops (micro-operations). Additionally, the core 106 may include a schedule unit 206. The schedule unit 206 may perform various operations associated with storing decoded instructions (e.g., received from the decode unit 204) until the instructions are ready for dispatch, e.g., until all source values of a decoded instruction become available. In one embodiment, the schedule unit 206 may schedule and/or issue (or dispatch) decoded instructions to an execution unit 208 for execution.

The execution unit 208 may execute the dispatched instructions after they are decoded (e.g., by the decode unit 204) and dispatched (e.g., by the schedule unit 206). In an embodiment, the execution unit 208 may include more than one execution unit (such as an imaging computational unit, a graphics computational unit, a general-purpose computational unit, etc.). The execution unit 208 may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit 208.

Further, the execution unit 208 may execute instructions out-of-order. Hence, the processor core 106 may be an out-of-order processor core in one embodiment. The core 106 may also include a retirement unit 210. The retirement unit 210 may retire executed instructions after they are committed. In an embodiment, retirement of the executed instructions may result in processor state being committed from the execution of the instructions, physical registers used by the instructions being de-allocated, etc.

The core 106 may also include a bus unit 214 to enable communication between components of the processor core 106 and other components (such as the components discussed with reference to FIG. 1) via one or more buses (e.g., buses 104 and/or 112). The core 106 may also include one or more registers 216 to store data accessed by various components of the core 106 (such as values related to assigned app priorities and/or sub-system states (modes) association.

Furthermore, even though FIG. 1 illustrates the logic 150 to be coupled to the core 106 via interconnect 112, in various embodiments logic 150 may be located elsewhere such as inside the core 106, coupled to the core via bus 104, etc. As shown in FIG. 2, core 106 may also include (and/or be coupled to) one or more of the sensors 160.

When considering energy consumption in client power delivery systems a Load Line (LL) resistor (or more generally an electrical load) is taken into consideration. To determine the impact on the operating voltage at LL, the corresponding Guard Band (GB) voltage value can be calculated as: LL guard band=LL resistor*IccMax, where IccMax refers to the maximum operating current (e.g., flowing through the LL resistor and/or IP/logic block being considered).

Moreover, the GB can be relatively high. For most applications, the average Icc (or average operating current) is lower than 50% of IccMax. This calculation shows that with an average current of Icc, another frequency bin may be gained without increasing the voltage supply to a processor core (or LL).

Generally, processor core perimeter power management can identify that a core generally runs at a relatively low Icc value. If the Icc is below some threshold, then it can be assumed that it is safe to increase the core's operating frequency. More particularly, frequency may be increased because the load line GB is not fully consumed, as discussed above. In case the current starts to increase above a threshold value, power management logic (e.g., logic 150) can throttle (or change the operating frequency of) the core back to a lower (e.g., original) operating frequency. Such embodiments may be implemented by utilizing a current sensor, instant frequency change, and/or a fast or dynamic processor core frequency throttling infrastructure, as discussed herein, e.g., with reference to FIGS. 3A-3C.

Table 1 below shows sample bin split data on an SoC two core product (where TDP refers to thermal design power and VID refers voltage identification or planned operating voltage):

TABLE 1

| | Frequency | | | | |
|---|---|---|---|---|---|
| | 2.5 | 2.6 | 2.7 | 2.8 | 2.9 |
| Core + Ring + LLC TDC AVX128: Current @ TDP workload [A] - tdp_p1_det | 10.7 | 11.3 | 12.1 | 12.7 | 13.52 |
| VID(v) - tdp_p1_det | 0.87 | 0.89 | 0.92 | 0.94 | 0.96 |
| VID of 50% less max current per core | 0.85 | 0.87 | 0.9 | 0.92 | 0.94 |

More particularly, Table 1 shows that if Icc is below 50% of IccMax, then it safe to increase the processor core's operating frequency by one bin. This is equal to about a 4% frequency improvement. Referring to Table1, an example would be to run at 2.5 GHz with VID=0.87V if IccMax is used. If we can use about half of IccMax, then VID=0.87V is sufficient for running at 2.6 GHz, which is a gain of one bin.

To this end, in one embodiment, a PLL (Phase Locked Loop) in a processor core has the ability to change the operating frequency of the processor core in two processor core clock cycles, e.g., by utilizing a version of a C++ compiler (such as ICL provided in some processors manufactured by Intel® Corporation).

Figure 3A:
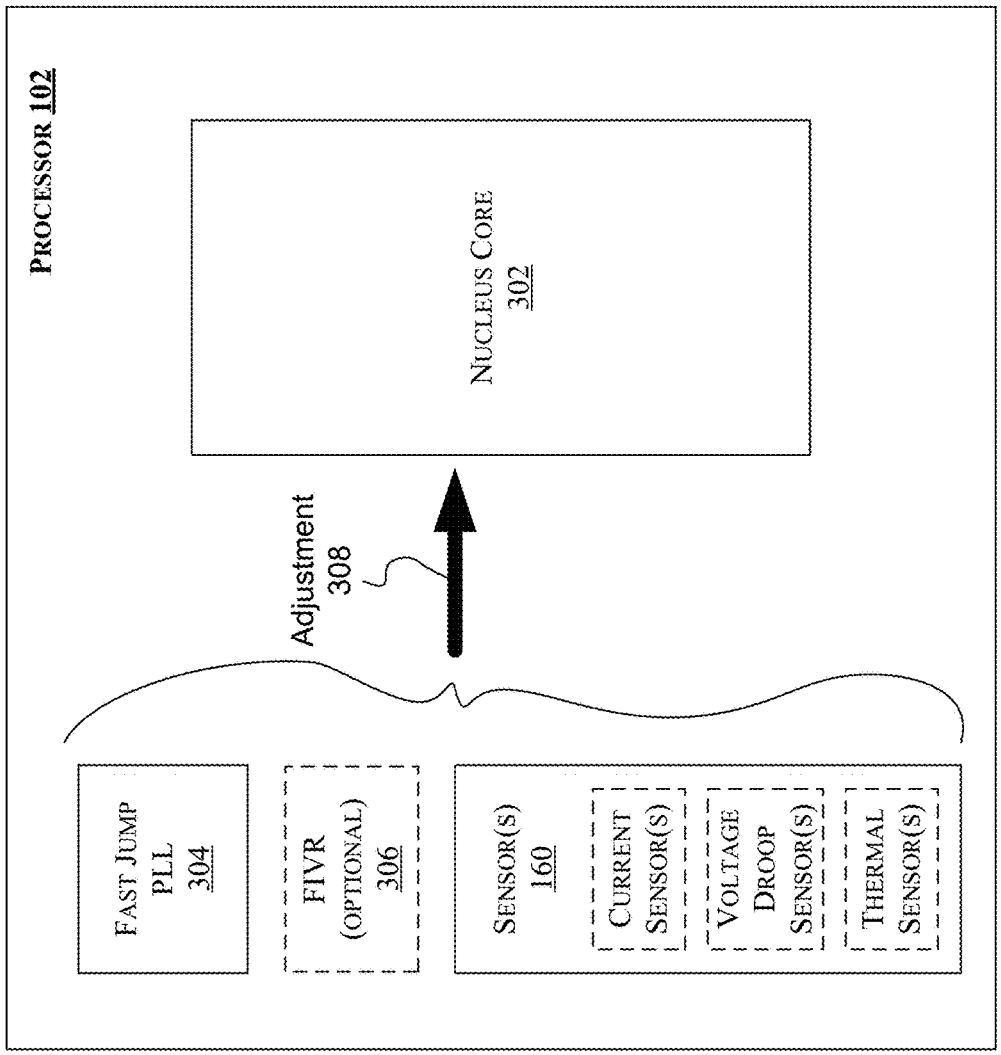
FIG. 3A illustrates some components of a processor in accordance with one embodiment.

More specifically, FIG. 3A illustrates some components of a processor in accordance with one embodiment. As shown processor 102 of FIG. 3A includes a nucleus core 302 (which may include one or more components as discussed with reference to cores 106 herein) and some logic (e.g., logic 150) to cause throttling 308 of the nucleus core 302. The throttling logic may include a fast jump PLL 304, an optional Fully Integrated Voltage Regulator (FIVR) 306, and one or more sensors 160 (such as a one or more current sensors, one or more voltage droop sensors, one or more thermal sensors, etc.).

As discussed herein, a voltage regulator (e.g., VR 130) integrated on-package or on-die is usually referred to as FIVR or integrated voltage regulator (IVR). The FIVR may be a buck converter that converts a supply voltage (e.g., of 5V or 12V) to a lower voltage used by the processor components. For example, this may allow for provision of differing supply voltages to the various components on the same semiconductor package or integrated circuit die.

In one embodiment, to make the processor core energy management feature work, at least one current sensor is utilized. A current sensor can be of any type, such as: (1) a current sensor (such as a PG or Power Gate current sensor) providing a relatively precise instantaneous current consumption value; and/or (2) FIVR current sensor supplying a threshold for the operating current. In both cases, if the detected operating current value is below about 50% of IccMax for some period of time, then a bin may be gained safely (e.g., processor core's operating current increased by some value such as a frequency bin). The length of this time period and/or the considered percentage of IccMax may be adjustable, e.g., defined by control/configuration bits.

Figure 3B:
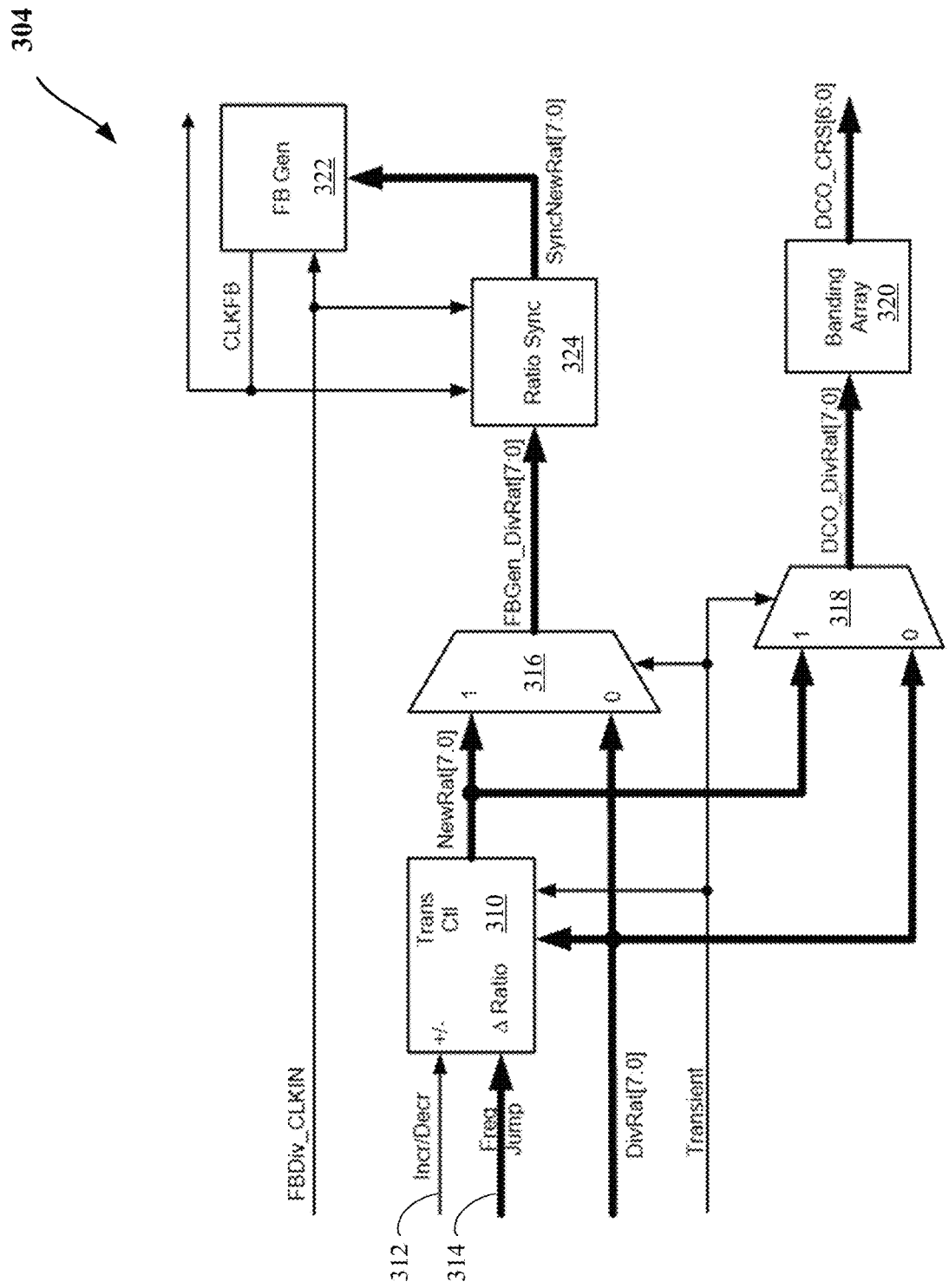
FIG. 3B illustrates some components of a fast jump phase locked loop logic, according to an embodiment.

FIG. 3B illustrates some components of a fast jump PLL logic, according to an embodiment. In an embodiment, the PLL shown in FIG. 3B shows various components of the PLL 304 of FIG. 3A. To change frequency, the PLL 304 is used in transient state, e.g., to achieve an instant frequency change. A frequency change is initiated at transition control logic 310 in response to its input signals, e.g., an input signal to increment/decrement by one bin 312 and a transition indication signal 314. Logic 310 outputs a new frequency ratio value to two multiplexers 316 and 318 that select between the new ratio provided by logic 310 or a present ratio value (DivRat). As shown, in one embodiment, each ratio value may be indicated by 8 bits (0 to 7). Two cycles later, the PLL 304 will move to a new operating frequency value. As discussed herein, DivRat generally refers to the target frequency for the PLL; banding array logic 320 refers to logic that configures the PLL per stored frequency (e.g., via a 7-bit signal called DCO CRS in FIG. 3B); and Frequency Band (FB) Gen logic 322 refers to logic that configures the current frequency value (e.g., per input from ratio synchronization logic 324 that assists in synchronization of the new frequency ratio).

Figure 3C:
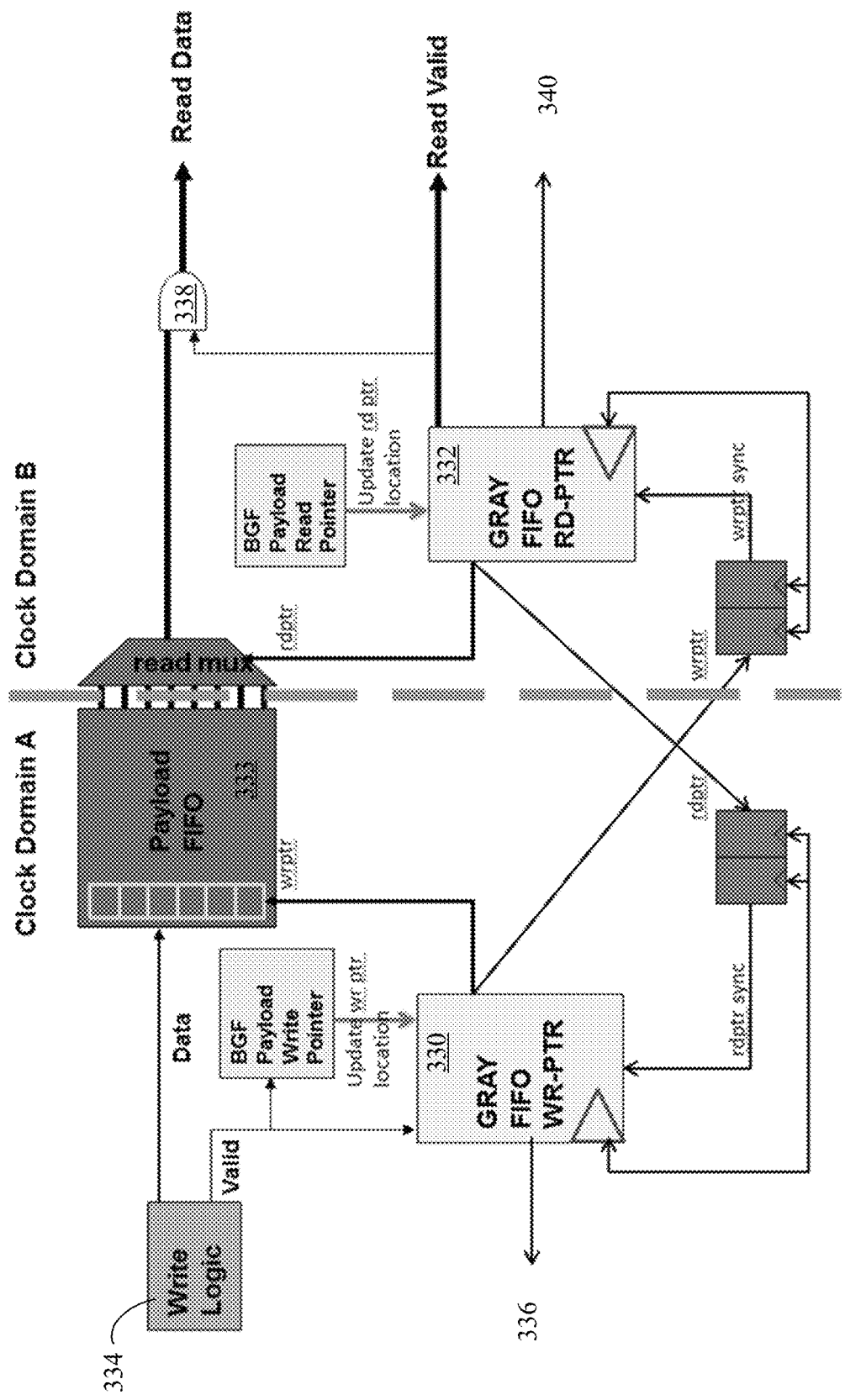
FIG. 3C illustrates some components associated with crossing clock domains, in accordance with an embodiment.

FIG. 3C illustrates some components associated with crossing clock domains, in accordance with an embodiment. In an embodiment, one or more of the components shown in FIG. 3C may be incorporated in logic 150 to allow for voltage and/or clock differences between clock domains associate with different components/agents in a system.

More particularly, to cross clock domains, an embodiment uses a hybrid BGF (Bubble Generator First-in, first-out) logic for instant frequency change. Hybrid BGF allows a move to/from the gray FIFO (First In, First Out) buffers 330/332 without draining power or at least with a much reduced power consumption level. Taking a write operation as an example (starting from the clock domain A in FIG. 3C), write logic 334 transmits data to a payload FIFO 333 and also sends a valid signal to the gray FIFO buffer 330 and BGF payload write pointer logic. As shown in FIG. 3C, the updated write pointer location is then provided to gray FIFO write pointer buffer 330, along with a read pointer synchronization signal (based on a register value as shown) that is generated at least partially based on a read pointer value provided by the buffer 332 (via a register as shown). In turn the write pointer is read from the FIFO 330 into the payload FIFO 333. As shown, FIFO 330 may also generate a FIFO full signal 336 to indicate that FIFO 330 is full in an embodiment.

On the receiving clock domain side (labeled clock domain B in FIG. 3C), data is read from the payload FIFO 333 (e.g., via an AND gate 338) based on a read pointer generated by the FIFO 332. The FIFO 332 may generate the read pointer fed to the payload FIFO 333 based on an updated read pointer location received from BGF payload read pointer logic as shown. FIFO 332 may also receive a write pointer synchronization signal (per a value stored in a register as shown), which may be generated based on a write pointer (e.g., stored in a register as shown) from FIFO 330. As shown, FIFO 332 may also generate read valid signal to indicate the read data is valid and a FIFO empty signal 340 to indicate that FIFO 332 is empty in some embodiments.

In an embodiment, three clock cycles may be used for the PLL operation and the clock distribution time. By contrast, some solutions may require change in any state. Also, in some embodiments, after some time the PLL locks on to the new frequency and the BGF mode may be resumed. In case Icc breaches the target threshold value, logic 150 may immediately throttle the processor core. The PLL 304 may then be cause to jump with a decrement of one bin. Moreover, the same hybrid BGF may be used to move to gray FIFO and a lower (e.g., original) operating frequency may be applied. After PLL moves to the lower (e.g., original) frequency (e.g., less than a single cycle of the clock), the throttling can be removed by logic 150.

In an embodiment, logic 150 may utilize a dynamic frequency scaling algorithm (e.g., such as those available in various PCU (Power Control Unit) logic of processors for adjusting the operating frequency of a processor core) to control the throttling of a processor core. The algorithm may be set to the minimal possible throttling to achieve the move by only a single bin. Further, telemetry logic (e.g., implemented via logic 150 and/or sensor(s) 160) may then measure the time period in increased frequency.

In an embodiment, Dynamic Voltage, Frequency Scaling (DVFS) logic may change the operating frequency and/or guard band, with no change to application behavior. For example, if Icc is below a threshold limit, then we will move to a higher operating frequency (e.g., increase by one bin) compared to a PCU target. In one embodiment, on exit from a low power consumption state (such as C6), logic 150 may start with the operating frequency indicated by the PCU plus one bin because on exit Icc is usually lower than TDP and with high probability adding one bin will not breach the load line guard band. Moreover, any request to throttle the processor core may force the use of a lower (e.g., original) frequency in an embodiment. In this throttling case, the request from the PCU may be used. Furthermore, dI-dT (or change in current (I) over time (T)) droop change with single frequency step/bin is generally considered to be relatively small. Also, assuming that NLC (Non-Linear Control), AFS (Adaptive Frequency Scaling), and DroopCalc (or droop calculation) features are activated (which may generally prevent dI-dT), a single bin/step frequency change is assumed to not cause a violation of dI-dT guard band.

Accordingly, some embodiments provide techniques for processor core energy management. As discussed herein, such embodiments may increase performance in Icc limited conditions, e.g., resulting in autonomous logic/IP blocks that may determine their target operating frequency by themselves or independently (or at most per input from a PCU).

Figure 4:
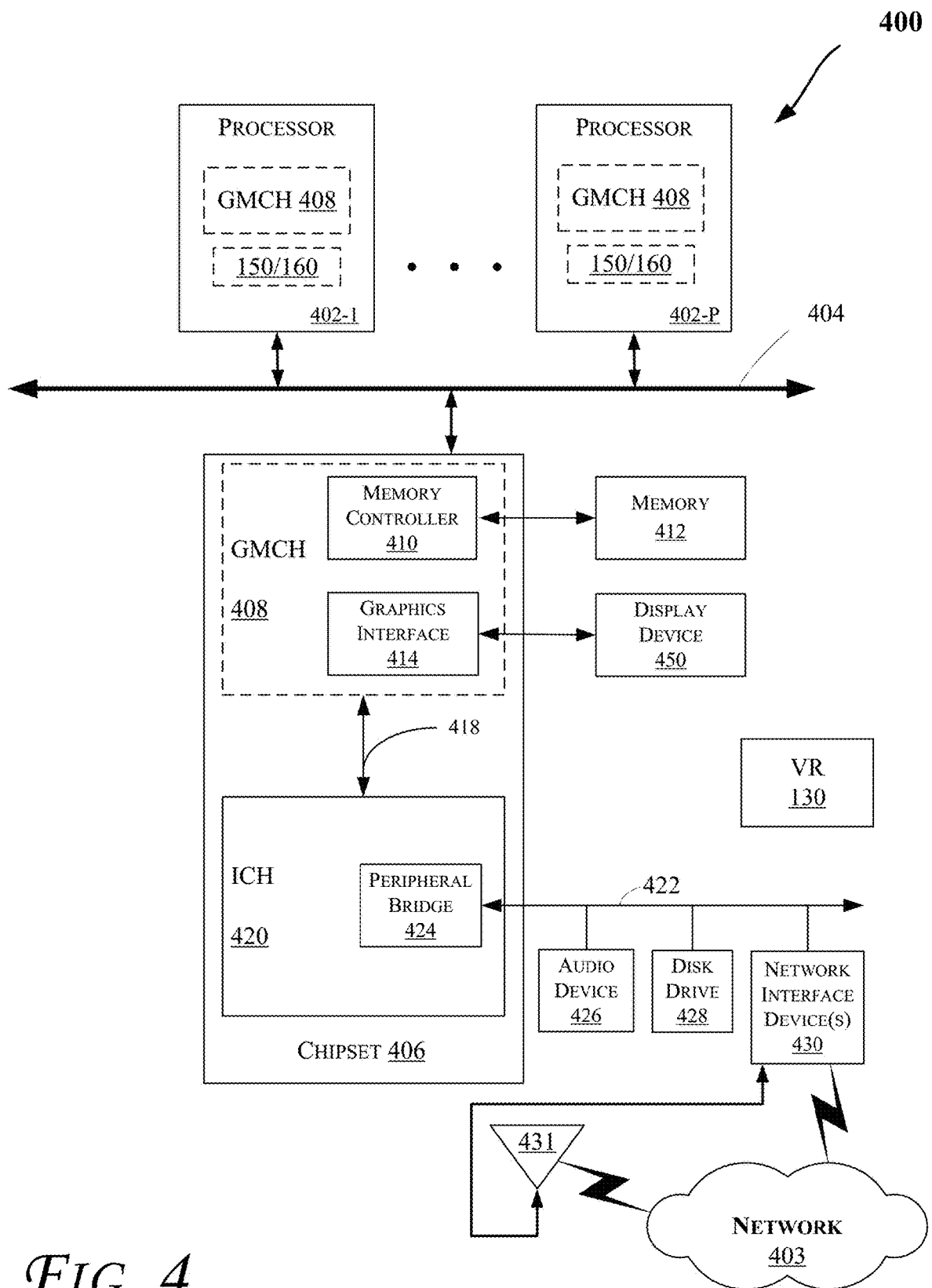

FIG. 4 illustrates a block diagram of a computing system 400 in accordance with an embodiment. The computing system 400 may include one or more central processing unit(s) (CPUs) or processors 402-1 through 402-P (which may be referred to herein as "processors 402" or "processor 402"). The processors 402 may communicate via an interconnection network (or bus) 404. The processors 402 may include a general purpose processor, a network processor (that processes data communicated over a computer network 403), or other types of a processor (including a reduced instruction set computer (RISC) processor or a complex instruction set computer (CISC)). Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors. In an embodiment, one or more of the processors 402 may be the same or similar to the processors 102 of FIG. 1. In some embodiments, one or more of the processors 402 may include one or more of the cores 106, VR 130, logic 150, and/or sensor(s) 160 of FIG. 1. Also, the operations discussed with reference to FIGS. 1-3C may be performed by one or more components of the system 400.

A chipset 406 may also communicate with the interconnection network 404. The chipset 406 may include a graphics and memory control hub (GMCH) 408. The GMCH 408 may include a memory controller 410 that communicates with a memory 412. The memory 412 may store data, including sequences of instructions that are executed by the processor 402, or any other device included in the computing system 400. In one embodiment, the memory 412 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 404, such as multiple CPUs and/or multiple system memories.

The GMCH 408 may also include a graphics interface 414 that communicates with a display device 450, e.g., a graphics accelerator. In one embodiment, the graphics interface 414 may communicate with the display device 450 via an accelerated graphics port (AGP) or Peripheral Component Interconnect (PCI) (or PCI express (PCIe) interface). In an embodiment, the display device 450 (such as a flat panel display (such as an LCD (Liquid Crystal Display), a cathode ray tube (CRT), a projection screen, etc.) may communicate with the graphics interface 414 through, for example, a signal converter that translates a digital representation of an image stored in a storage device such as video memory or system memory into display signals that are interpreted and displayed by the display. The display signals produced may pass through various control devices before being interpreted by and subsequently displayed on the display device 450.

A hub interface 418 may allow the GMCH 408 and an input/output control hub (ICH) 420 to communicate. The ICH 420 may provide an interface to I/O devices that communicate with the computing system 400. The ICH 420 may communicate with a bus 422 through a peripheral bridge (or controller) 424, such as a peripheral component interconnect (PCI) bridge, a universal serial bus (USB) controller, or other types of peripheral bridges or controllers. The bridge 424 may provide a data path between the processor 402 and peripheral devices. Other types of topologies may be utilized. Also, multiple buses may communicate with the ICH 420, e.g., through multiple bridges or controllers. Moreover, other peripherals in communication with the ICH 420 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 422 may communicate with an audio device 426, one or more disk drive(s) 428, and one or more network interface device(s) 430 (which is in communication with the computer network 403). Other devices may communicate via the bus 422. Also, various components (such as the network interface device 430) may communicate with the GMCH 408 in some embodiments. As shown, the network interface device 430 may be coupled to an antenna 431 to wirelessly (e.g., via an Institute of Electrical and Electronics Engineers (IEEE) 802.11 interface (including IEEE 802.11a/b/g/n, etc.), cellular interface, 3G, 3G, LPE, etc.) communicate with the network 403. Other devices may communicate via the bus 422. In addition, the processor 402 and the GMCH 408 may be combined to form a single chip. Furthermore, the graphics accelerator may be included within the GMCH 408 in other embodiments.

Furthermore, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 400 may be arranged in a point-to-point (PtP) configuration. For example, processors, memory, and/or input/output devices may be interconnected by a number of point-to-point interfaces.

Figure 5:
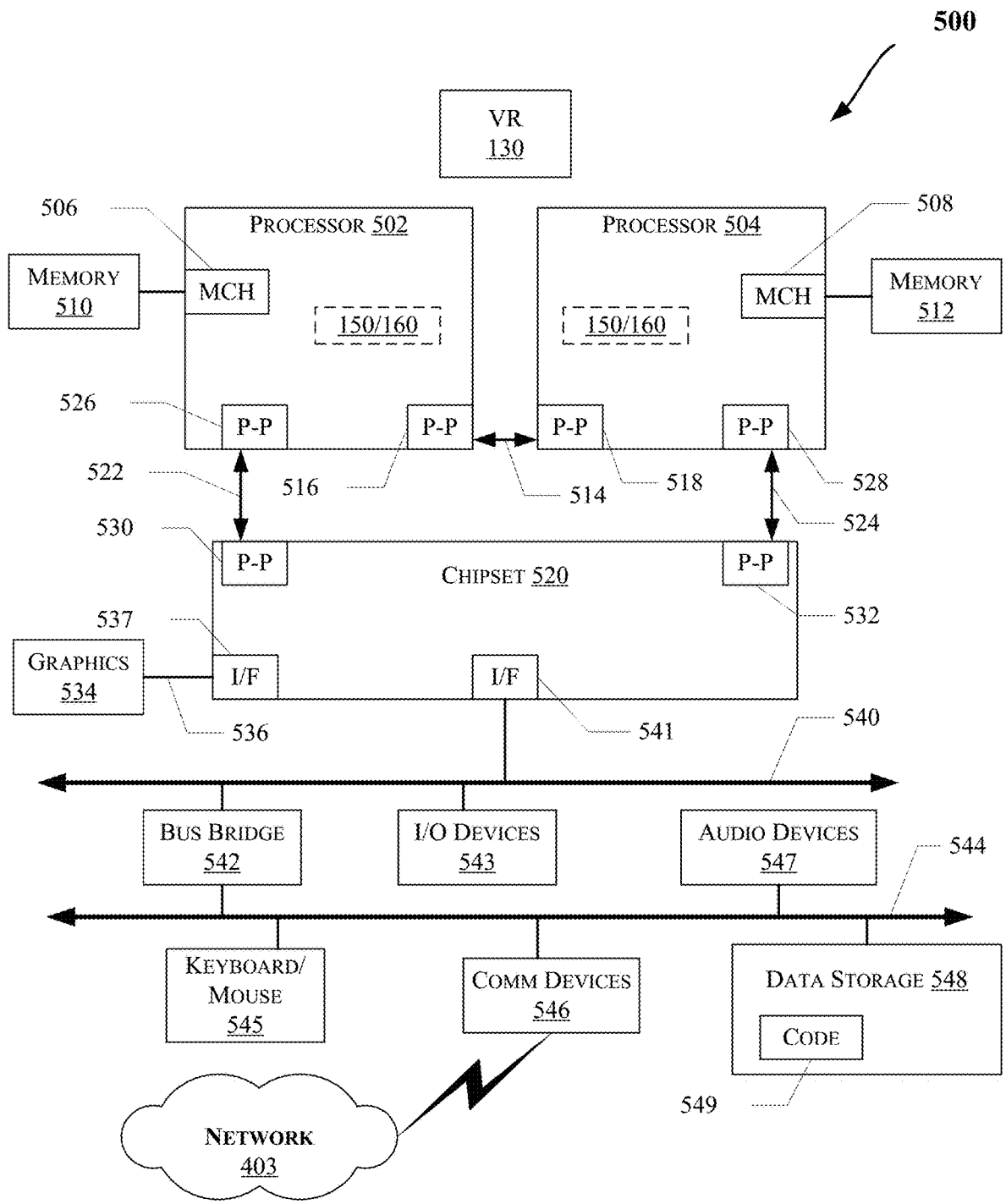

FIG. 5 illustrates a computing system 500 that is arranged in a point-to-point (PtP) configuration, according to an embodiment. In particular, FIG. 5 shows a system where processors, memory, and input/output devices are interconnected by a number of point-to-point interfaces. The operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller hub (MCH) 506 and 508 to enable communication with memories 510 and 512. The memories 510 and/or 512 may store various data such as those discussed with reference to the memory 412 of FIG. 4. Also, the processors 502 and 504 may include one or more of the cores 106, logic 150, sensor(s) 160, and/or VR 130 of FIG. 1.

In an embodiment, the processors 502 and 504 may be one of the processors 402 discussed with reference to FIG. 4. The processors 502 and 504 may exchange data via a point-to-point (PtP) interface 514 using PtP interface circuits 516 and 518, respectively. Also, the processors 502 and 504 may each exchange data with a chipset 520 via individual PtP interfaces 522 and 524 using point-to-point interface circuits 526, 528, 530, and 532. The chipset 520 may further exchange data with a high-performance graphics circuit 534 via a high-performance graphics interface 536, e.g., using a PtP interface circuit 537.

In at least one embodiment, one or more operations discussed with reference to FIGS. 1-5 may be performed by the processors 502 or 504 and/or other components of the system 500 such as those communicating via a bus 540. Other embodiments, however, may exist in other circuits, logic units, or devices within the system 500 of FIG. 5. Furthermore, some embodiments may be distributed throughout several circuits, logic units, or devices illustrated in FIG. 5.

Chipset 520 may communicate with the bus 540 using a PtP interface circuit 541. The bus 540 may have one or more devices that communicate with it, such as a bus bridge 542 and I/O devices 543. Via a bus 544, the bus bridge 542 may communicate with other devices such as a keyboard/mouse 545, communication devices 546 (such as modems, network interface devices, or other communication devices that may communicate with the computer network 403), audio I/O device, and/or a data storage device 548. The data storage device 548 may store code 549 that may be executed by the processors 502 and/or 504.

Figure 6:
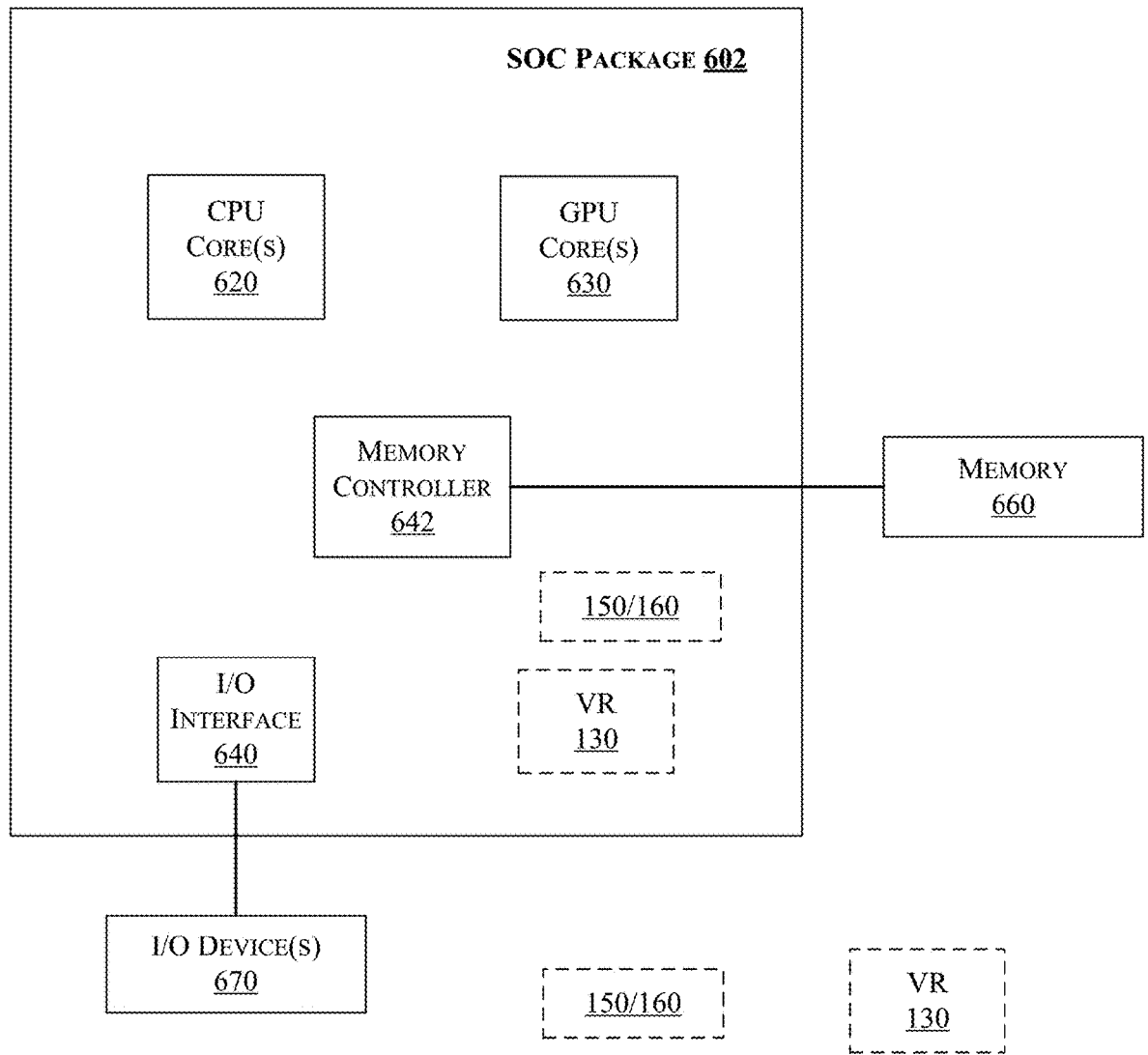

In some embodiments, one or more of the components discussed herein can be embodied as a System On Chip (SOC) device. FIG. 6 illustrates a block diagram of an SOC package in accordance with an embodiment. As illustrated in FIG. 6, SOC 602 includes one or more Central Processing Unit (CPU) cores 620, one or more Graphics Processor Unit (GPU) cores 630, an Input/Output (I/O) interface 640, and a memory controller 642. Various components of the SOC package 602 may be coupled to an interconnect or bus such as discussed herein with reference to the other figures. Also, the SOC package 602 may include more or less components, such as those discussed herein with reference to the other figures. Further, each component of the SOC package 620 may include one or more other components, e.g., as discussed with reference to the other figures herein. In one embodiment, SOC package 602 (and its components) is provided on one or more Integrated Circuit (IC) die, e.g., which are packaged into a single semiconductor device.

As illustrated in FIG. 6, SOC package 602 is coupled to a memory 660 (which may be similar to or the same as memory discussed herein with reference to the other figures) via the memory controller 642. In an embodiment, the memory 660 (or a portion of it) can be integrated on the SOC package 602.

The I/O interface 640 may be coupled to one or more I/O devices 670, e.g., via an interconnect and/or bus such as discussed herein with reference to other figures. I/O device(s) 670 may include one or more of a keyboard, a mouse, a touchpad, a display, an image/video capture device (such as a camera or camcorder/video recorder), a touch screen, a speaker, or the like. Furthermore, SOC package 602 may include/integrate one or more of: the logic 150, VR 130, and/or one or more sensors 160 in an embodiment. Alternatively, one or more of: the logic 150, VR 130, and/or one or more sensors 160 may be provided outside of the SOC package 602 (i.e., as a discrete logic).

The following examples pertain to further embodiments. Example 1 includes 1 includes an apparatus comprising: energy management logic, at least a portion of which is in hardware, to cause a modification to energy consumption by an electrical load based at least in part on comparison of an electrical current value and an operating current threshold value, wherein the electrical current value is to be detected at an electrical current sensor coupled to the electrical load. Example 2 includes the apparatus of example 1, wherein the operating current threshold value is to be determined based on a ratio of a maximum operating current value for the electrical load. Example 3 includes the apparatus of example 1, wherein the electrical load is to comprise a processor core. Example 4 includes the apparatus of example 1, wherein the modification to the energy consumption is to comprise a change to an operating frequency of a processor core. Example 5 includes the apparatus of example 4, wherein the energy management logic is to cause the change to the operating frequency of the processor core for a duration of at or below about 100 usec. Example 6 includes the apparatus of example 4, wherein the energy management logic is to cause the change for a duration of less than about 1 usec. Example 7 includes the apparatus of example 1, further comprising one or more sensors to detect one or more of: a voltage droop value, a temperature value, operating frequency, an operating voltage value, or a power consumption value. Example 8 includes the apparatus of example 1, further comprising one or more sensors to detect a variation in one or more factors having an effect on power or thermal behavior of the electrical load. Example 9 includes the apparatus of example 1, comprising logic to transfer information from a first clock domain of the electrical load to a second clock domain of the electrical load. Example 10 includes the apparatus of example 1, comprising a phase locked loop logic, coupled to the energy management logic, to change a supplied operating current to the electrical load. Example 11 includes the apparatus of example 1, further comprising a fully integrated voltage regulator to regulate a supply of voltage to the electrical load. Example 12 includes the apparatus of example 1, wherein one or more of: the energy management logic, a processor having one or more processor cores, the electrical current sensor, a fully integrated voltage regulator, and memory are on a single integrated circuit.

Example 13 includes a method comprising: causing a modification to energy consumption by an electrical load, at energy management logic, based at least in part on comparison of an electrical current value and an operating current threshold value, wherein the electrical current value is detected at an electrical current sensor coupled to the electrical load. Example 14 includes the method of example 13, further comprising determining the operating current threshold value based on a ratio of a maximum operating current value for the electrical load. Example 15 includes the method of example 13, wherein the modification to the energy consumption comprises a change to an operating frequency of a processor core. Example 16 includes the method of example 15, further comprising the energy management logic causing the change to the operating frequency of the processor core for a duration of at or below about 100 usec. Example 17 includes the method of example 15, further comprising the energy management logic causing the change for a duration of less than about 1 usec. Example 18 includes the method of example 13, further comprising one or more sensors detecting a variation in one or more factors having an effect on power or thermal behavior of the electrical load. Example 19 includes the method of example 13, further comprising transferring information from a first clock domain of the electrical load to a second clock domain of the electrical load.

Example 20 includes a computer-readable medium comprising one or more instructions that when executed on at least one processor configure the at least one processor to perform one or more operations to: cause a modification to energy consumption by an electrical load, at energy management logic, based at least in part on comparison of an electrical current value and an operating current threshold value, wherein the electrical current value is detected at an electrical current sensor coupled to the electrical load. Example 21 includes the computer-readable medium of example 20, further comprising one or more instructions that when executed on the at least one processor configure the at least one processor to perform one or more operations to cause determination of the operating current threshold value based on a ratio of a maximum operating current value for the electrical load. Example 22 includes the computer-readable medium of example 20, wherein the modification to the energy consumption comprises a change to an operating frequency of a processor core.

Example 23 includes a computing system comprising: memory to store data; a processor core, coupled to the memory, to perform one or more operations on the stored data; and energy management logic, at least a portion of which is in hardware, to cause a modification to energy consumption by an electrical load based at least in part on comparison of an electrical current value and an operating current threshold value, wherein the electrical current value is to be detected at an electrical current sensor coupled to the electrical load. Example 24 includes the system of example 23, wherein the operating current threshold value is to be determined based on a ratio of a maximum operating current value for the electrical load. Example 25 includes the system of example 23, wherein the electrical load is to comprise a processor core. Example 26 includes the system of example 23, wherein at least one network interface is to communicate the data.

Example 27 includes an apparatus comprising means to perform a method as set forth in any preceding example. Example 28 comprises machine-readable storage including machine-readable instructions, when executed, to implement a method or realize an apparatus as set forth in any preceding example.

In various embodiments, the operations discussed herein, e.g., with reference to FIGS. 1-6, may be implemented as hardware (e.g., logic circuitry), software, firmware, or combinations thereof, which may be provided as a computer program product, e.g., including a tangible machine-readable or computer-readable medium having stored thereon instructions (or software procedures) used to program a computer to perform a process discussed herein. The machine-readable medium may include a storage device such as those discussed with respect to FIGS. 1-6.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   a clock source to provide a clock of a first frequency to a processor core; and
   a power management circuitry to determine a load condition of the processor core, wherein the power management circuitry is to compare the load condition with a threshold load condition, wherein the power management circuitry is to instruct the clock source to temporarily increase a frequency of the clock from the first frequency to a second frequency based on the load condition being less than the threshold load condition, and wherein the clock source is to increase the frequency of the clock to the second clock frequency without losing a phase locked condition.

2. The apparatus of claim 1 comprises a voltage generator to generate a power supply for the apparatus, wherein the clock source is to increase frequency of the clock to the second clock frequency without increasing voltage level of the power supply for the apparatus.

3. The apparatus of claim 1, wherein the clock source is one of a phase locked loop (PLL) and a frequency locked loop (FLL).

4. The apparatus of claim 1, wherein the clock source comprises a dynamic frequency scaling circuitry.

5. An apparatus comprising:
   a current sensor to sense current drawn by a processor;
   a circuitry to adjust a divider ratio of a divider; and
   a phase locked loop (PLL) comprising the divider, wherein the PLL is to increase frequency of its output clock when the current drawn by the processor is below a threshold, as such the apparatus is classified for a higher product bin, wherein the PLL is to increase the frequency of the clock to the second clock frequency without losing a phase locked condition.

6. The apparatus of claim 5 comprising adaptive voltage frequency scaling circuitry coupled to the PLL.

7. The apparatus of claim 5, wherein the circuitry is part of a power management unit or controlled by the power management unit.

8. The apparatus of claim 5, wherein the PLL is to increase the frequency by 100 MHz.

9. The apparatus of claim 5 comprising a voltage regulator to provide current, which is sensed by the current sensor.

10. The apparatus of claim 5, wherein the increased frequency is a new peak frequency of the apparatus.

11. One or more non-transitory computer-readable media comprising instructions that, upon execution of the instructions by one or more processors of an electronic device, are to cause a power management circuitry of an electronic device to:
    determine a load condition of a processor core;
    compare the load condition with a threshold load condition; and
    instruct a clock source to temporarily increase a frequency of a clock provided to the processor core from a first frequency to a second frequency based on the load condition being less than the threshold load condition;
    wherein the clock source is to, upon receipt of the instructions from the power management circuitry, increase the frequency of the clock from the first frequency to the second frequency without losing a phase locked condition.

12. The one or more non-transitory computer-readable media of claim 11, wherein the clock source is further to, upon receipt of the instructions from the power management circuitry, increase the frequency of the clock to the second clock frequency without increasing a voltage level provided by a power supply.

13. The one or more non-transitory computer-readable media of claim 11, wherein the clock source is one of a phase locked loop (PLL) and a frequency locked loop (FLL).

14. The one or more non-transitory computer-readable media of claim 11, wherein the clock source includes a dynamic frequency scaling circuitry.

15. A method comprising:
    determining, by power management circuitry of an electronic device, a load condition of a processor core of the electronic device;
    comparing, by the power management circuitry, the load condition with a threshold load condition; and
    instructing, by the power management circuitry, a clock source of the electronic device to temporarily increase a frequency of a clock provided to the processor core from a first frequency to a second frequency based on the load condition being less than the threshold load condition;
    wherein the clock source is to, upon receipt of the instructions from the power management circuitry, increase the frequency of the clock from the first frequency to the second frequency without losing a phase locked condition.

16. The method of claim 15, wherein the clock source is further to, upon receipt of the instructions from the power management circuitry, increase the frequency of the clock to the second clock frequency without increasing a voltage level provided by a power supply.

17. The method of claim 15, wherein the clock source is one of a phase locked loop (PLL) and a frequency locked loop (FLL).

18. The method of claim 15, wherein the clock source includes a dynamic frequency scaling circuitry.

* * * * *